United States Patent [19]
Hafford

[11] Patent Number: 6,120,341
[45] Date of Patent: Sep. 19, 2000

[54] THREE SOUND CHAMBER GAME CALL

[76] Inventor: Darrell D. Hafford, 7390 Hwy. 145 South, Harrisburg, Ill. 62946

[21] Appl. No.: 09/385,854

[22] Filed: Aug. 30, 1999

[51] Int. Cl.[7] .................................................. A63H 5/00
[52] U.S. Cl. ...................... 446/208; 446/202; 446/205; 446/207
[58] Field of Search .................................. 446/176, 180, 446/188, 195, 196, 202, 203, 205, 206, 207, 208; 84/380 R, 380 B, 396, 399

[56] References Cited

U.S. PATENT DOCUMENTS

| | | |
|---|---|---|
| 2,606,400 | 8/1952 | Olt et al. . |
| 3,151,517 | 10/1964 | Guinness . |
| 3,991,513 | 11/1976 | Faulk . |
| 4,143,485 | 3/1979 | Stewart . |
| 4,179,845 | 12/1979 | Jacob . |
| 4,612,001 | 9/1986 | Burnham ................... 446/208 |
| 4,915,660 | 4/1990 | Overholt, Sr. ............ 446/207 |
| 4,940,451 | 7/1990 | Leady ....................... 446/208 |
| 5,030,159 | 7/1991 | Beer ......................... 446/208 |
| 5,643,039 | 7/1997 | McIntyre ................... 446/208 |
| 5,885,126 | 3/1999 | Carlson ..................... 446/208 |

*Primary Examiner*—Kien Nguyen
*Assistant Examiner*—Jeffrey D. Carlson
*Attorney, Agent, or Firm*—Don W. Weber

[57] ABSTRACT

A unique three sound chamber game call is presented, which creates a wide variety of game calls and sounds utilized in detecting the location of game. The game call has a first sound chamber or mouthpiece barrel in which a vibrating reed is located. The cylindrical portion of the reed carrier may connect the first mouthpiece barrel sound chamber to a second middle baffle sound chamber. The aperture of the second middle sound chamber reduces the exit area of the air blown over the reed and thus changes the pitch of the call. A trombone-like third baffle or sound chamber is placed over the end of the second sound chamber. The third sound chamber can be taken off completely, increasing the volume of the call or may slide up and down the outer end of the second sound chamber varying the tone, pitch and volume of the call. Different reeds and reed holders may be utilized along with the three separate sound chambers to produce calls capable of detecting and calling in the location of animals as varied as owls, coyote, ducks, turkeys, elk, deer or other animals.

5 Claims, 3 Drawing Sheets

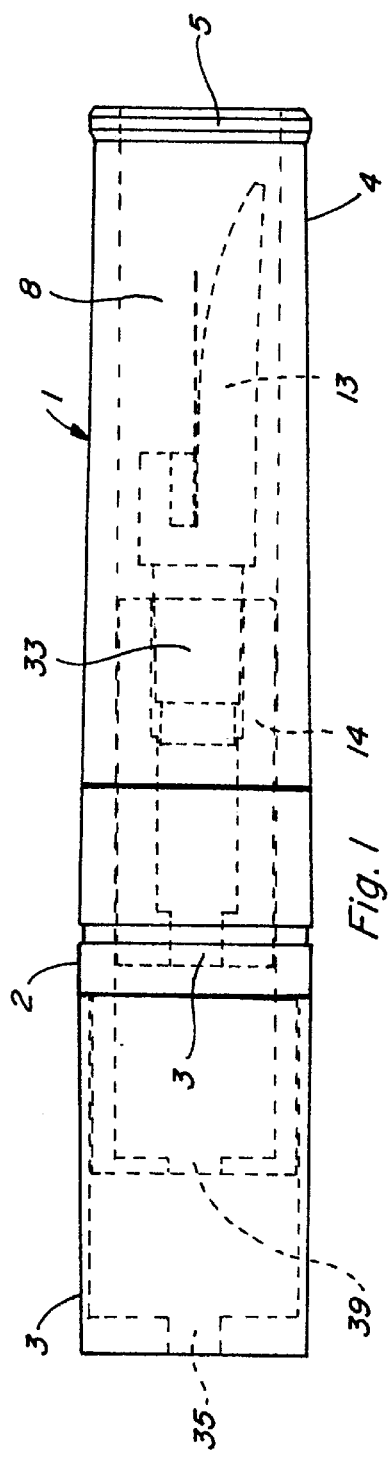
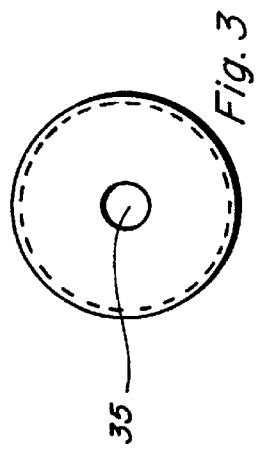
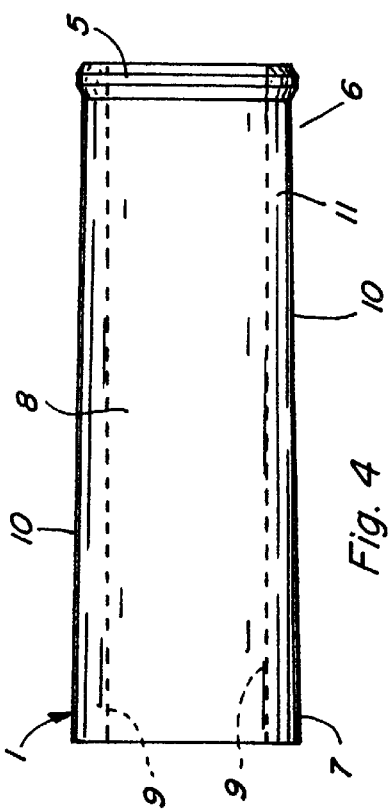
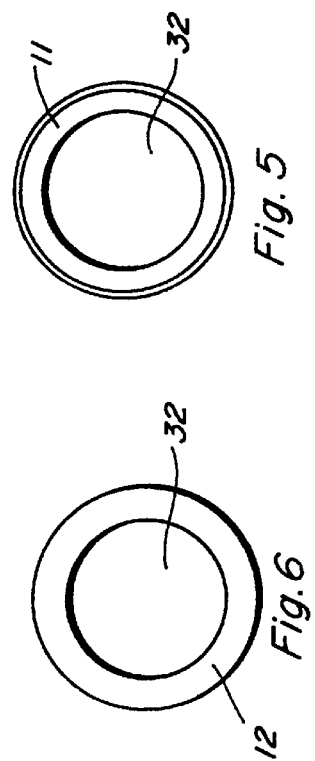
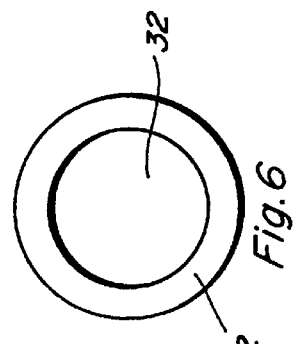

THREE SOUND CHAMBER GAME CALL

BACKGROUND OF THE INVENTION

This invention relates to the field of hunting. More specifically, a three sound chamber reed-type game call is presented.

The sport of hunting often requires the use of game calls in order to attract or located the game being hunted. Different types of calls have been invented for use in the outdoor hunting sports. Separate calls have been devised which are designed to attract owls, turkeys, deer, elk, coyotes, and other types of game. Normally, these game calls are specialized as to the type of animal sought, or even to the type of animal sound meant to be mimicked (for example, the grunt or bleat of a white-tail deer).

It is an object of this invention to provide a unique game call capable of duplicating many different types of animal sounds.

Oftentimes, calls allow the user to change the length of the vibration of the reed in order to change the sound of the call. For example, the 1997 patent issued to McIntyre allows the user to adjust the call to change the type of sound made. The adjustment in McIntyre is made by adjusting the length that the reed is able to vibrate in the initial sound chamber by the use of clips. A single length reed could be used to produce different sounds, because the length of the vibration can be adjusted. McIntyre is provided with one or more tuning clips that can be removably installed to limit the effective vibrating length of the reed.

The instant device uses three separate sound chambers to vary the sound produced. It is a further object of this invention to allow the user to imitate various different types of game and game sounds utilizing a single game call having three baffles.

Other types of devices have been invented to allow the user to change the sound produced by the game call. Some of these devices involve compressing the passageway or sound chamber by the use of fingers to vary the sound produced by the game call. The 1991 patent issued to Beer for an adjustable reed sounder is one such type of device. This call consists of an elongated reed centrally positioned in a passageway between a pair of sidewalls and end walls with a generally rectangular shaped body. A person can vary the sound that the call makes by compressing the side passageways and causing the reed to vibrate in varying tones and sounds.

The instant device differs from the Beer reed sounder in that it provides three, closed baffle chambers which may be used individually or in combination to produce the varying sounds of animals sought to be located. It is a still further object of this invention to produce a unitary game call having three sound chambers in which the initial sound chamber can be used either singly or in conjunction with the second or third sound chambers to produce varying calls imitating the sounds of owls, turkeys, elk, ducks, deer, coyotes, and other animals.

Other and further objects of this invention will become apparent upon reading the below described specification.

BRIEF DESCRIPTION OF THE DEVICE

A three sound chamber game call is presented that mimics the sounds made by a wide variety of different game animals. The first sound chamber includes an elongated, cylindrical mouthpiece barrel into which the reed portion of a barrel shaped reed holder is inserted. The other portion of the reed holder protrudes out of the other end of the mouthpiece barrel. A second middle baffle or sound chamber is then connected to the mouthpiece barrel, with one end of the middle baffle sliding over the protruding main body of the reed holder. The middle baffle holder has a small aperture at the other end to restrict air flow. This restriction of the airflow changes the tone of the call. A third baffle chamber is a trombone-like baffle chamber which slips over the end of the middle baffle. This third baffle chamber also has a small exit aperture at its far end. By attaching or unattaching either the middle or end baffles, different tones can be achieved by using the same call. Since the end baffle is adjustable, similar to a trombone, many different calls can be mimicked by use of the device. With the end baffle removed, the user has better volume but loses some of the tonal qualities. With both the end and middle baffles removed, an ideal elk call is produced. Changing the reeds also produces varying calls for different types of animals.

BRIEF DESCRIPTION OF THE DRAWING FIGURES

FIG. 1 is a side view having all three baffle chambers attached.

FIG. 2 is a right end view of the device showing the mouthpiece front aperture.

FIG. 3 is a left end view of the device showing the back end baffle aperture.

FIG. 4 is a side view of the mouthpiece barrel sound chamber.

FIG. 5 is a right end view of the mouthpiece chamber shown in FIG. 4.

FIG. 6 is a left end view of the mouthpiece chamber shown in FIG. 4.

DETAILED DESCRIPTION OF THE PREFERRED EMBODIMENT

Figure 7:
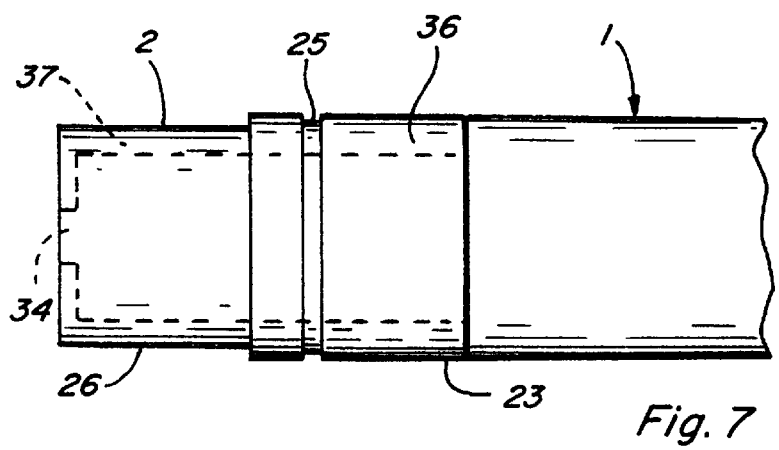
FIG. 7 is a side view of the middle baffle sound chamber.

A multi-chambered game call made of gray PVC plastic has four main parts. The game call has a first mouthpiece barrel 1 and a second middle baffle sound chamber 2. In between the first and second sound chambers is a standard reed holder 13. An end baffle sound chamber 3 also slides over the end of the middle baffle sound chamber for certain applications of the device.

As best shown in FIGS. 1, 2 and 3, the game call has a cylindrical mouthpiece barrel 1 to which is connected a middle baffle sound chamber 2. Connected to the middle baffle sound chamber 2 is a sliding end baffle sound chamber 3. The mouthpiece barrel 1 and middle baffle sound chamber 2 are held together by pressing each onto the cylindrical body 14 of the standard reed holder 13, shown in FIG. 13. Different sounds are produced by reducing the aperture through which blown air may pass, and by varying the size of the sound chamber and the thickness of the sound chamber walls.

Figures 11, 12:
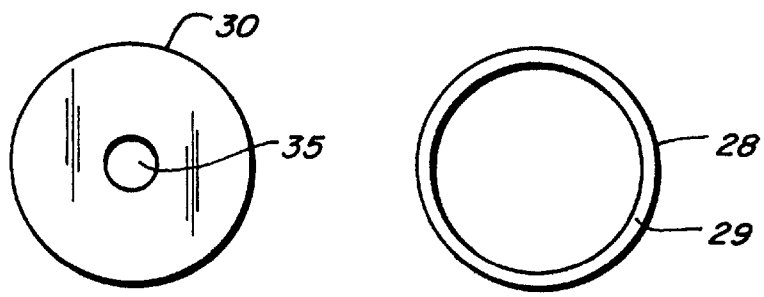
FIG. 11 is a right end view of the end baffle sound chamber shown in FIG. 10.
FIG. 12 is a left end view of the end baffle sound chamber shown in FIG. 10.

The mouthpiece barrel 1 has a front aperture 32 as best shown in FIGS. 2 and 5 which is reduced throughout the length of the game call to a much smaller back end baffle end aperture 35, as best shown on FIGS. 3 and 12. It is this reduction in the apertures, as well as varying the size of the sound chambers and the thickness of the individual sound chamber walls which produces the unique characteristics of the instant invention.

Turning now to FIG. 4, the preferred embodiment of the mouthpiece barrel 1 is more particularly shown. The mouthpiece barrel 1 has a mouthpiece flange 5, through which the user introduces blown air. Air is directed through the initial sound chamber area 8 and onto the reed 17. The reed then vibrates and produces a particular sound.

Figure 13:
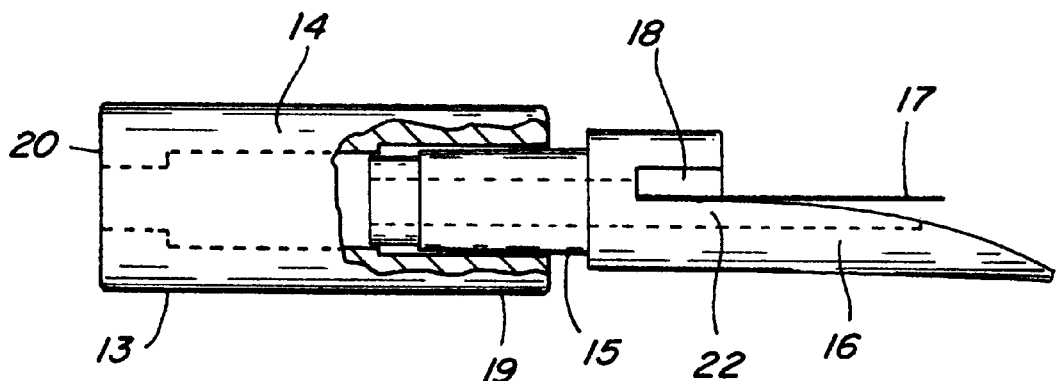
FIG. 13 is a side view of a standard reed holder.

The mouthpiece barrel 1 also has a middle baffle end 7. This middle baffle 7 is adapted to receive the standard reed holder 13 and reed 17. This standard reed holder 13 is best shown in FIG. 13.

The reed holder 13, as shown and described, is of common construction and is in common use throughout the industry. The standard reed holder 13 comprises a cylindrical main body 14, a reed holder neck 15, and a reed holder stem 16. The cylindrical body, neck and stem are formed as a whole in the standard construction of a reed holder. The reed 17 is attached to the reed holder 13 by means of the removable reed holder block 18. Reeds 17 may be interchanged in this invention by removing the reed holder block 18 and replacing the reed. Different reeds and reed holders utilized in this invention, along with the one, two or three sound chambers, produce a wide variety of game calls. A variety of reeds and reed holders are available in the field and are well-known in the art.

The main reed holder body 14 has a stem end 19 and a middle baffle end 20. These ends are removably inserted, respectively, into the mouthpiece barrel 1 and the middle baffle sound chamber 2, and connect the mouthpiece barrel and the middle baffle sound chamber. The main body of the reed holder has a circumference 21, as best shown on FIG. 15, to snugly secure the mouthpiece barrel 1 and the middle baffle 2 together.

Figure 14:
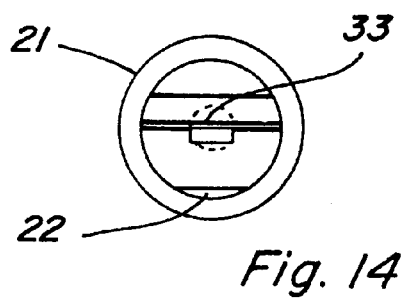
FIG. 14 is a right end view of the standard reed holder shown in FIG. 13.
Figure 15:
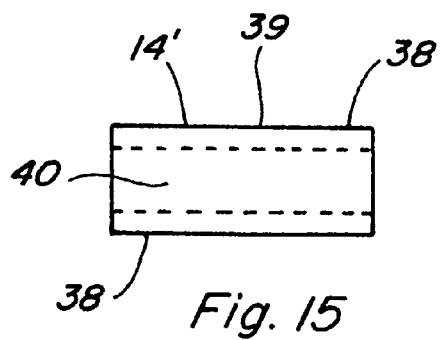
FIG. 15 is a side view of a reed holder cylindrical main body.

Another embodiment of the joining device is illustrated at FIG. 15. In this embodiment, a tapered reed holder main cylindrical body 14' is shown. This tapered reed holder body 14' has a generally cylindrical cross-section, similar to the cross-section shown in FIG. 14. The main body 14' is hollow, having a void as shown at 40. However, the outer ends 38 of the reed holder have a smaller circumference than the central longitudinal center 39 of the reed holder. This creates a generally cylindrical yet tapered reed holder main body 14'.

Attached to this tapered reed holder main body 14' is a standard reed containing section, which is generally comprised of the neck 15, stem 16, reed 17, and reed holder block 18. This reed containing section would be attached to the tapered reed holder cylindrical body 14' shown in FIG. 15. The second embodiment using the tapered reed holder main body 14' attached to the reed holder section would then be inserted as shown in FIG. 1. Since reed holders are standard throughout the art, the only modification in this embodiment is to provide a tapered reed holder main cylindrical body 14' to accommodate the connection between the mouthpiece barrel 1 and the middle baffle sound chamber 2.

The standard reed holder stem 16 also has a reed holder stem groove 22. This standard reed holder stem 16 thus has a reed holder aperture 33, as best shown in FIG. 14, for the transmission of blown air through the initial mouthpiece barrel sound chamber 1 and into the middle baffle sound chamber 2.

The mouthpiece barrel 1, as shown in FIGS. 4 through 6, has parallel inner baffle walls 9 and tapered outer walls 10. The thickness of the walls of the mouthpiece barrel 1 are shown on FIGS. 5 and 6. Since the inner walls 9 of the mouthpiece barrel 1 are parallel, the mouthpiece front aperture 32, as shown in FIG. 5, is the same size as the aperture 32 of the middle baffle end of the mouthpiece barrel. However, since the walls of the barrel are tapered, the flanged end thickness 11 of the mouthpiece barrel is different from the middle baffle end thickness 12. In the preferred embodiment, the flanged end thickness 11 is 0.265 inches while the middle baffle end 12 is 0.365 inches. These dimensions are preferred, although they are not meant as an exact limitation as to the thicknesses that could be utilized in practicing this invention. All dimensions given herein are preferred, although they may be varied slightly (±0.06 inches) while still keeping within the spirit and disclosure of this invention. While the wall thicknesses are important, they may vary within the tolerances set out above and still achieve the unique characteristics produced by this device.

The length of the mouthpiece barrel 1 from end to end is approximately 3.71 inches, including the approximately 0.1870 inch thick flange mouthpiece 5.

Figures 8, 9:
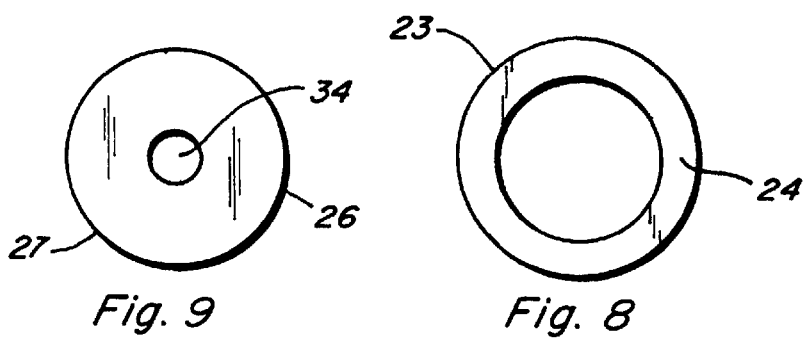
FIG. 8 is a right end view of the middle baffle sound chamber shown in FIG. 7.
FIG. 9 is a left end view of the middle baffle sound chamber shown in FIG. 7.

As best shown on FIGS. 7 through 9, the middle baffle sound chamber 2 has a middle baffle sound chamber mouthpiece end 23 which is joined adjacent to the mouthpiece barrel 1 as shown in FIG. 1 by the standard reed holder cylindrical main body 14 as described above. FIG. 7 shows the middle baffle 2 with the barrel 1 attached.

The middle baffle sound chamber 2 has a middle baffle sound chamber mouthpiece end thickness 24 as best shown in FIG. 8. This middle baffle mouthpiece end thickness 24 is 0.395 inches in the preferred embodiment, ± the tolerances of 0.005 inches. The middle baffle 2 also has a circumferential groove 25, as shown in FIG. 7. The middle baffle sound chamber 2 has a reduced middle baffle back end 26 which is adapted to receive the end baffle sound chamber 3. The outer circumference 27 of the middle baffle is 1.1270 inches in the preferred embodiment, ±0.06 inches. The middle baffle back end 26 has a middle baffle back end aperture 34 as best shown in FIGS. 1, 7, and 9. This middle baffle back end aperture 34 is 0.2700 inches in the preferred embodiment. As can be seen from these aperture dimensions, air is restricted at the apertures of the varying sound chambers, which produces unique sounds.

The middle baffle 2 has walls of varying thickness, as best shown on FIG. 7. The middle baffle mouthpiece end thickness 36 is approximately 0.365 inches while the middle baffle back end thickness 37 is approximately 0.265 inches. Again, the wall thicknesses described herein are the preferred embodiment and produce the most desired sounds and tones. However, these thicknesses may be varied somewhat while still keeping within the spirit and disclosure of the instant invention. Generally, tolerances of ±0.06 inches are preferred.

The overall length of the middle baffle 2 is approximately 2.125 inches, and the middle baffle end aperture is approximately 0.2700 inches in diameter. Once again, the small apertures enable and aid the user in reproducing any number of different game calls and sounds.

Figure 10:
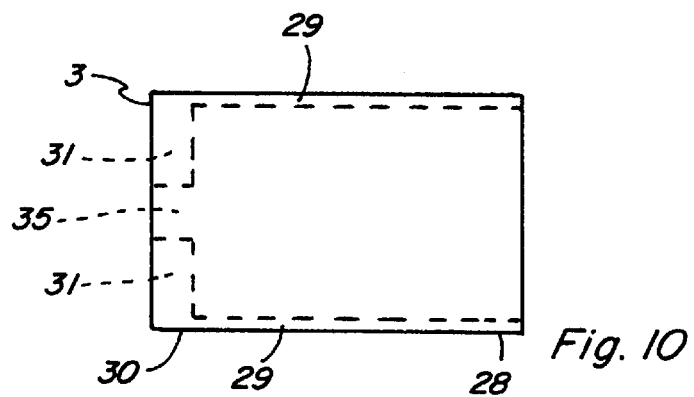
FIG. 10 is a side view of the end baffle sound chamber.

FIGS. 10 through 12 show more particularly the third end baffle sound chamber 3, as best shown on FIG. 10. This end baffle sound chamber 3 has very thin walls and a generally rectangular shape with a cylindrical cross-section. The third back end baffle sound chamber is approximately 1.96 inches long and has an outer diameter of approximately 1.2250 inches. The walls 29 of the third baffle sound chamber are approximately 0.0970 inches at the back end baffle middle baffle end 28.

This third sound chamber 3 has a central back end baffle end aperture 35, as best shown on FIGS. 3 and 12. This back end baffle end aperture 35 is approximately 0.2700 inches in diameter. The back end baffle third sound chamber 3 also has a back end baffle end 30 which has expanded walls 31 as best shown on FIG. 10. These expanded walls 31 are approximately 0.955 inches in thickness as opposed to the very thin walls 29 of the other end of the third sound chamber as described above.

The assembled game call 4 is shown in FIG. 1. This game call may be utilized by attaching the main mouthpiece barrel 1 to either the second sound chamber or to the second and third sound chambers 3 as shown on the assembled game call 4. If the mouthpiece barrel 1 is utilized in conjunction with the second sound chamber 2, a good volume is obtained. Placing the third sound chamber 3 over the first and second sound chambers causes the user to lose some of the volume of the call but increases the tones which can be achieved. The trombone-like sliding effect of the third sound chamber 3, when utilized in conjunction with the first and second sound chambers, allows the user to create a large number of varying tones, pitches, and volumes for use in varying the call to locate or attract game.

This device may be used for an elk call, when both the second and third sound chambers are removed from the game call. The reed itself may be changed when using the game call for elk as opposed to turkey or as a deer call. This single game call may be utilized for a wide variety of game, including the barred owl, coyote, elk, duck or white-tail deer. The call can create an owl hoot, a coyote call, the quack of a duck or the grunt or bleat of the deer.

The game call may be simply manufactured of PVC pipe turned on a lathe, or it can be fabricated from molds. It has been found that plastics are ideal for the production of this device since the molecules of plastics do not change in widely varying temperatures, for example −35 degrees Fahrenheit to over 200 degrees Fahrenheit. Woods such as walnut, maple, cherry or oak may be utilized although it has been found that wood has not been able to withstand the varying temperatures often found in the hunting sport.

The middle and back baffles are the unique parts of this invention and they give the call its tone. As air passes through the middle and back baffles, volume is decreased while the tones are increased. The call is operated by huffing from the diaphragm into the mouthpiece to produce the sound of the barred owl. By cupping one's hands around the back of the back baffle, different tones can be achieved. The right sound and volume for this unique game call was achieved by changing the thickness and size of the call. While these sound chambers have the dimensions as described herein, it must be specifically recognized that these dimensions may be changed by varying the sizes, thicknesses and lengths of the three sound chambers somewhat. For example, tolerances of ±0.06 inches are well within the spirit and disclosure of this device. While the thicknesses described herein are preferred, many other different thicknesses, lengths and types of material chosen for the production of this call are well within the contemplation and disclosure herein.

What is claimed is:

1. A game call device, comprising:
   (a) A first cylindrical barrel sound chamber having a mouthpiece end and a middle sound chamber end, adapted to receive the stem end of a reed holder;
   (b) A second middle cylindrical sound chamber, having a first end joined to the middle sound chamber end of said first sound chamber and a second middle sound chamber back end, wherein said middle sound chamber back end has a central aperture that is significantly smaller in diameter than said second sound chamber as a whole;
   (c) A third cylindrical sound chamber, having a first end joined to said second sound chamber back end and a second back end, wherein said third sound chamber back end has a central aperture that is significantly smaller in diameter than said third sound chamber as a whole; and
   (d) A reed holder and reed, wherein said reed holder comprises a stem end located in the mouthpiece end of said first sound chamber and a middle sound chamber end located in the first end of said middle sound chamber, wherein said reed is attached to the stem end of said reed holder.

2. A game call device as in claim 1, wherein said second sound chamber is approximately 2.125" inches in length.

3. A game call device as in claim 1, wherein said second and third sound chamber end apertures are 0.270 inches plus or minus 0.060 inches in diameter.

4. A game call device, comprising:
   (a) A first cylindrical barrel sound chamber having a mouthpiece end and a middle sound chamber end adapted to receive the stem end of a reed holder, wherein the walls of said first sound chamber are 0.265 inches ±0.06 inches thick at said mouthpiece end and 0.365 inches ±0.06 inches thick at said middle sound chamber end;
   (b) A second middle cylindrical sound chamber, having a first end joined to the middle sound chamber end of said first sound chamber and a second middle sound chamber back end, wherein said middle sound chamber back end has a central aperture that is significantly smaller in diameter than said second sound chamber as a whole, wherein the walls of said second chamber are 0.265±0.06 inches thick at said second end;
   (c) A third cylindrical sound chamber, having a first end joined to said second sound chamber back end and a second back end, wherein said third sound chamber back end has a central aperture that is significantly smaller in diameter than said third sound chamber as a whole; and
   (d) A reed holder and reed, wherein said reed holder comprises a stem end located in the mouthpiece end of said first sound chamber and a middle sound chamber end located in the first end of said middle sound chamber, wherein said reed is attached to the stem end of said reed holder.

5. A game call device comprising:
   (a) A first cylindrical barrel sound chamber having a mouthpiece end and a middle sound chamber end adapted to receive the stem end of a reed holder, wherein the walls of said first sound chamber are 0.265 inches ±0.06 inches thick at said mouthpiece end and 0.365 inches ±0.06 inches thick at said middle sound chamber end;

(b) A second middle cylindrical sound chamber, having a first end joined to the middle sound chamber end of said first sound chamber and a second middle sound chamber back end, wherein said middle sound chamber back end has a central aperture that is 0.270 inches ±0.060 inches in diameter, wherein the walls of said second sound chamber are 0.265±0.060 inches thick at said second end;

(c) A third cylindrical sound chamber, having a first end joined to said second sound chamber back end and a second back end, wherein said third sound chamber back end has a central aperture that is 0.270 inches ±0.060 inches in diameter; and (d) A reed holder and reed, wherein said reed holder comprises a stem end located in the mouthpiece end of said first sound chamber and a middle sound chamber end located in the first end of said middle sound chamber, wherein said reed is attached to the stem end of said reed holder.

* * * * *